United States Patent
Critchley et al.

(10) Patent No.: US 10,877,843 B2
(45) Date of Patent: Dec. 29, 2020

(54) RAID SYSTEMS AND METHODS FOR IMPROVED DATA RECOVERY PERFORMANCE

(71) Applicant: International Business Machines Corporation, Armonk, NY (US)

(72) Inventors: Daniel S. Critchley, Winchester (GB); Gordon D. Hutchison, Eastleigh (GB); Gareth P. Jones, Hampshire (GB); Jonathan W. L. Short, Eastleigh (GB)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 16/546,807

(22) Filed: Aug. 21, 2019

(65) Prior Publication Data

US 2019/0377640 A1    Dec. 12, 2019

Related U.S. Application Data

(63) Continuation of application No. 15/410,509, filed on Jan. 19, 2017, now Pat. No. 10,459,795.

(51) Int. Cl.
*G06F 11/10* (2006.01)
*G06F 3/06* (2006.01)

(52) U.S. Cl.
CPC .......... *G06F 11/1088* (2013.01); *G06F 3/061* (2013.01); *G06F 3/064* (2013.01); *G06F 3/0619* (2013.01); *G06F 3/0689* (2013.01)

(58) Field of Classification Search
CPC .... G06F 11/1088; G06F 3/061; G06F 3/0619; G06F 3/064; G06F 3/0689
See application file for complete search history.

(56) References Cited

U.S. PATENT DOCUMENTS 6,138,125 A * 10/2000 Demoss .............. G06F 11/1076
                                                                707/999.202
6,219,800 B1    4/2001 Johnson et al.
(Continued)

OTHER PUBLICATIONS

C. Wu, X. He, J. Li and M. Guo, "Code 5-6: An Efficient MDS Array Coding Scheme to Accelerate Online RAID Level Migration," 2015 44th International Conference on Parallel Processing, Beijing, 2015, pp. 450-459. (Year: 2015).*

(Continued)

*Primary Examiner* — Kyle Vallecillo
(74) *Attorney, Agent, or Firm* — Kunzler Bean & Adamson

(57) ABSTRACT

A RAID system, RAID controller, method, and computer program product for reducing the number of reads of XOR data in a multi-storage-enclosure RAID array includes a RAID array controller that implements a selected distributed RAID scheme. The RAID array controller determines a set of drives and logical block addresses corresponding to a parity group and divides the set of drives into subsets of drives that are located within each individual storage enclosure of the multiple storage enclosures. The controller issues a single EnclosureXOR Read to each storage enclosure corresponding to the subsets of drives to read enclosure-level intermediate XOR data calculated by each storage enclosure for each subset of drives and in response to receiving the enclosure-level intermediate XOR data results from all storage drives in the parity group, and calculates an array level XOR result by XORing the enclosure-level intermediate XOR data results from the storage enclosures.

20 Claims, 7 Drawing Sheets

(56) References Cited

U.S. PATENT DOCUMENTS

| | | | |
|---|---|---|---|
| 6,526,477 B1* | 2/2003 | Yuan | G06F 3/061 |
| | | | 710/52 |
| 7,389,393 B1* | 6/2008 | Karr | G06F 3/0613 |
| | | | 711/103 |
| 8,261,124 B2 | 9/2012 | Carmichael | |
| 8,397,002 B2 | 3/2013 | Chikusa et al. | |
| 8,650,471 B2 | 2/2014 | Kotzur et al. | |
| 8,924,776 B1 | 12/2014 | Mollov et al. | |
| 9,639,457 B1* | 5/2017 | Piszczek | G06F 11/1076 |
| 10,120,769 B2 | 11/2018 | Sreedhar et al. | |
| 2005/0273651 A1* | 12/2005 | Subbarao | G06F 11/1076 |
| | | | 714/6.12 |
| 2006/0236029 A1 | 10/2006 | Corrado et al. | |
| 2014/0122744 A1 | 5/2014 | Madhusudana et al. | |
| 2014/0189212 A1 | 7/2014 | Slaight et al. | |
| 2015/0097185 A1 | 4/2015 | Bae | |
| 2015/0106563 A1 | 4/2015 | Hsu-Hung et al. | |
| 2016/0188410 A1 | 6/2016 | Lee | |
| 2016/0259567 A1 | 9/2016 | Webster | |
| 2016/0342462 A1* | 11/2016 | Karamanolis | G06F 3/0619 |
| 2016/0342468 A1* | 11/2016 | Karamanolis | G06F 3/0619 |
| 2016/0342814 A1* | 11/2016 | Wang | G06F 21/64 |
| 2016/0357649 A1 | 12/2016 | Karrotu et al. | |
| 2017/0031791 A1* | 2/2017 | Pan | G06F 11/1096 |
| 2017/0168896 A1 | 6/2017 | Karrotu et al. | |
| 2017/0322845 A1 | 11/2017 | Nomura et al. | |
| 2018/0018231 A1 | 1/2018 | Okada et al. | |
| 2018/0074891 A1 | 3/2018 | Yang et al. | |
| 2018/0107546 A1* | 4/2018 | Huang | G06F 3/0619 |
| 2018/0181612 A1* | 6/2018 | Danilov | G06F 16/2365 |

OTHER PUBLICATIONS

"HP Smart Array Controller Technology", Hewlett-Packard Development Company, L.P., Technical White Paper, 16 pages, Aug. 2014.

Sorenson et al. "Optimizing RAID Storage Performance with the SAS-based Dell PERC 5", Dell Inc., Dell Power Solutions, 4 pages, Aug. 2007.

Vyverman et al. "The French Connection—Implementing a RAID Controller Algorithm in Base SAS", SAS Global Forum 2010, Applications Development, Paper 008-2010, 18 pages, 2010.

Houlder et al. "XOR Commands on SCSI Disk Drives" Seagate Technology, X3T10/94-111r9, 30 pages, available at: http://www.t10.org/ftp/t10/document.94/94-111r9.pdf, last accessed Jan. 17, 2017.

Dachary "Ceph Erasure Code Jerasure Plugin Benchmarks", Free Software Developer Journey, 3 pages, May 28, 2014, available at: http://dachary.org/?p=3042, last accessed Jan. 17, 2017.

* cited by examiner

RAID SYSTEMS AND METHODS FOR IMPROVED DATA RECOVERY PERFORMANCE

CROSS-REFERENCE TO RELATED APPLICATIONS

This application is a continuation of and claims priority to U.S. patent application Ser. No. 15/410,509 entitled "RAID SYSTEMS AND METHODS FOR IMPROVED DATA RECOVERY PERFORMANCE" and filed on Jan. 19, 2017, for Daniel S. Critchley, et al., which is incorporated herein by reference in its entirety.

BACKGROUND

The present disclosure relates to RAID systems and methods. More specifically, although not exclusively, the present disclosure relates to improvements in distributed RAID systems and methods for data recovery following storage device failure.

SUMMARY

According to an aspect of the present disclosure, a RAID array controller distributes a stride of parity data for a parity group across a RAID array consistent with a selected distributed RAID scheme. The RAID array includes multiple storage enclosures each having multiple storage drives within, where the RAID array controller determines the drives and LBAs for the parity group, divides the set of drives into subsets for each individual storage enclosure and issues a single enclosure-level XOR read ("EnclosureXOR Read") request to each storage enclosure corresponding to the subsets of drives to read enclosure-level intermediate XOR data calculated by each storage enclosure for each subset of drives. The RAID array controller sends a read request to read a single enclosure-level intermediate XOR data result from the individual storage enclosures, the enclosure-level intermediate XOR data results corresponding to XOR data for the subset of drives within the individual storage enclosures, and in response to receiving the enclosure-level intermediate XOR data results from all storage drives in the parity group, calculates an array level XOR result by performing an XOR operation on the enclosure-level intermediate XOR data results from the individual storage enclosures. The functions of the RAID controller may be performed by a method and a computer program product may implement the method.

BRIEF DESCRIPTION OF THE DRAWINGS

Example implementations of the present disclosure will be described below with reference to the following drawings, in which.

DETAILED DESCRIPTION

Figure 1:
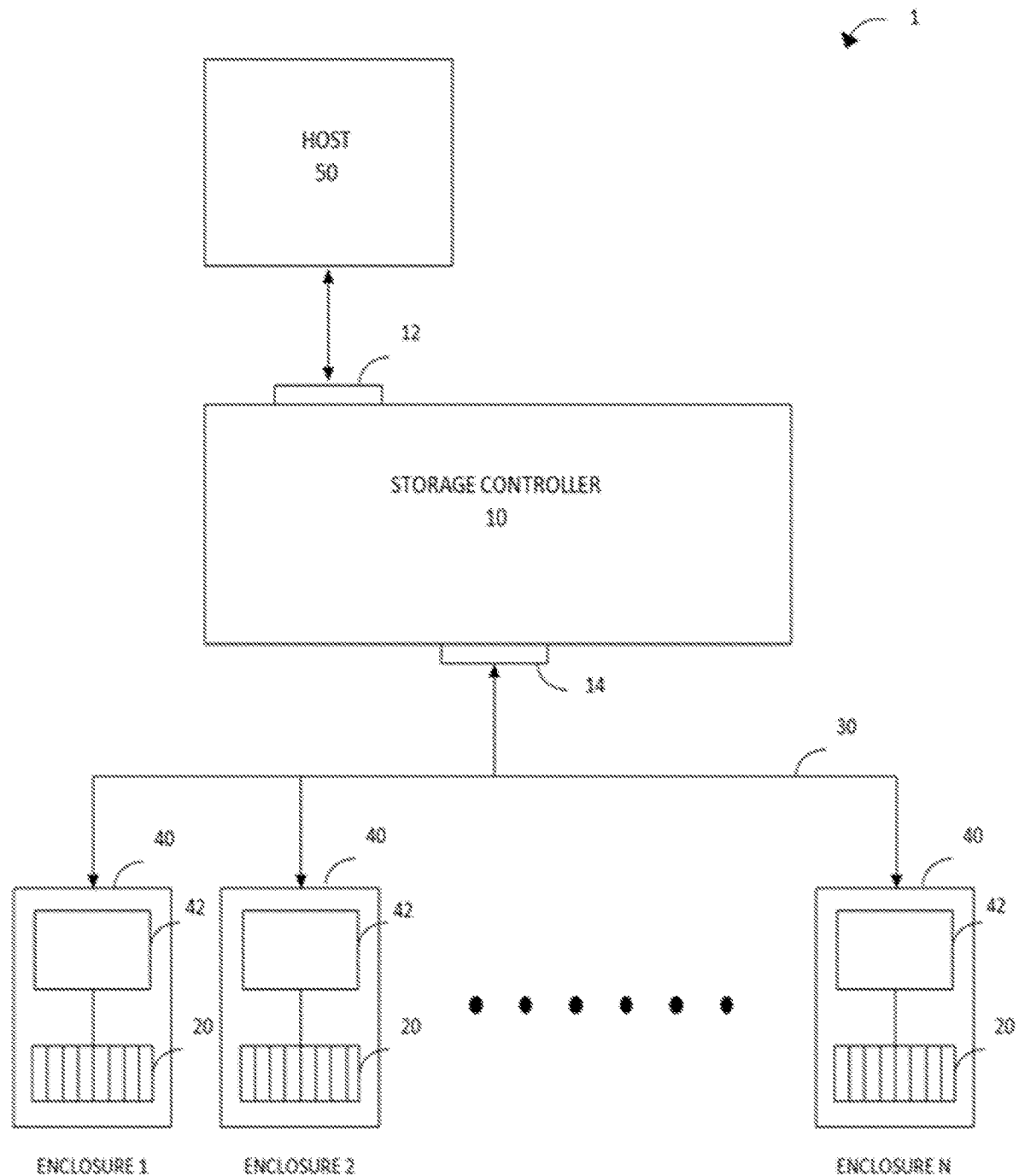
FIG. 1 is a schematic block diagram of a RAID system according to example implementations of the present disclosure.

In the following description, the acronym RAID refers to "Redundant Array of Independent Disks". RAID is a well-known data storage technology, in which data is distributed across an array comprising a plurality of physical storage devices (traditionally disk drives) for the purpose of data redundancy and improved performance. RAID may be implemented using so-called "data striping", in which consecutive segments or elements of logically sequential data (called "chunks", "strides" or "stripe units") are stored on different physical storage devices. Such data striping enables concurrent data accesses, thereby leading to improved performance such as increased speed of read and write operations.

RAID schemes include an error protection/redundancy scheme known as "parity". Parity data for a chunk of user data (e.g., data block) is calculated from the bit-level data using a parity algorithm, which is typically based on the "Exclusive or" (XOR) logical operation. In RAID schemes with distributed parity, such as RAID 5 or RAID 6, storage of the parity data for each chunk is distributed across a subset of the disk drives, which form a "redundancy group" (also known as a "parity group" when referring to a subset of drives for a particular "stride"). The parity data is stored in the array in a corresponding "parity block" for redundancy and error correction. Accordingly, following failure of a particular disk drive in a RAID system, lost data from a non-operating disk drive may be recovered in a regeneration and/or rebuild operation using surviving data from the redundancy group and the parity data from the other operating disk drives in the array.

Demands for improvements in storage system performance have led to the use of increasing numbers of physical disk drives in a RAID system. For example, 128 physical disk drives may be used to store data in a RAID system with distributed parity as described above. Whilst an increased number of drives increases data access speed, and thus improves performance, the totality of data stored in a large disk drive that has failed can still take considerable time to reconstruct. By spreading the user and parity data that makes up the redundancy group across all members of the array, many drives can take part in the recovery process. In particular, although one parity group in a single stride may involve 17 drives, by varying the parity group membership across the address range of the drives, the whole process of data recovery may utilize user and parity data from up to 127 drives in the RAID array of 128 drives concurrently, leading to bottlenecks in data traffic and increasing the total time to regenerate the data.

The following detailed description of example implementations of the present disclosure use Serial Attached SCSI (SAS) disk drive technologies for RAID systems. As the skilled person will appreciate, the teachings of the present disclosure are not limited to SAS-based systems but may be implemented in conjunction with other types of disk drive or data storage technology, whether now known or developed in the future.

Example implementations of the present disclosure include systems, methods and computer program products in a RAID system, as discussed above. The disclosed example implementations may be used for improved data recovery and rebuild time following failure of a storage device, such as a disk drive, as described in further detail below. In the drawings, the same or similar features are assigned the same or similar reference numerals.

FIG. 1 is a schematic block diagram of a RAID system 1 according to example implementations of the present disclosure. The RAID system 1 comprises a storage controller 10 (also called "array controller" herein) in communication with a plurality of storage devices 20 over a storage area network 30 and, separately, in communication with a host system 50. In particular, the storage controller 10 comprises a front-end port 12 connected to a host system 50 (e.g., client system) and a back-end port 14 connected to the plurality of storage devices 20. Storage controller 10 performs data storage management in accordance with a RAID scheme. In particular, storage controller 10 may retrieve data from the storage devices 20 over network 30 in response to a read request from the host system 50 and may store data in the storage devices 20 over network 30 in response to a write request from the host system 50, in accordance with the relevant RAID scheme. In addition, storage controller 10 may perform other RAID system management processes, including data recovery (regeneration and rebuild) as described below.

As shown in FIG. 1, a subset of the plurality of storage devices 20 may be arranged together in a single storage device enclosure 40 (also called "storage enclosure" or simply "enclosure" herein). Each storage enclosure 40 may accommodate up to a predefined number of storage devices (e.g., 16 or 32 disk drives), typically on a single backplane, and may further provide management of power, temperature control and the like for those storage devices. In example implementations, each enclosure 40 may comprise a Serial Attached SCSI (SAS) expansion device (an "expansion device" is also called "expander" herein) having SCSI Enclosure Services (SES) capability, and may be connected over a SAS network 30 to a SAS port 14 of the array controller 10. As the skilled person will appreciate, SAS supports redundant connectivity. Thus, whilst FIG. 1 only shows a single SAS port 14 of the array controller 10, two physical SAS ports 14 (e.g., left-hand and right-hand ports) may be used in practice.

In accordance with example implementations of the present disclosure, each storage enclosure 40 comprises an enclosure processor 42 for processing data of the plurality of storage devices 20 therein. In particular, although not exclusively, enclosure processor 42 may be implemented in combination with the SES capability of the enclosure 40 and connected with an input/output (I/O) interface (e.g., SAS interface of the enclosure). Enclosure processor 40 may be configured to perform methods according to the present disclosure as described below.

Figure 2:
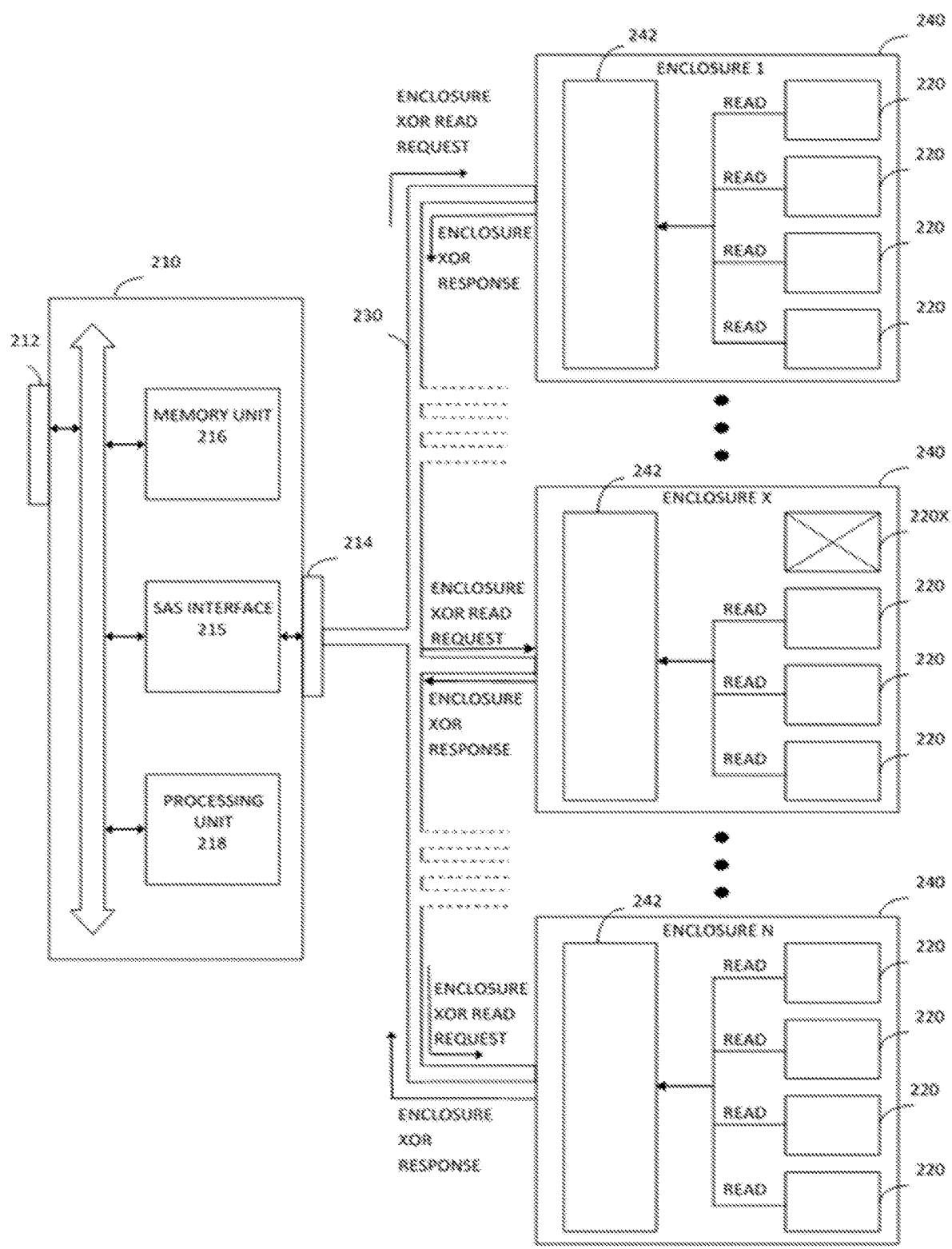
FIG. 2 is a schematic block diagram illustrating a process for data regeneration in a RAID system in accordance with example implementations of the present disclosure.
Figure 3:
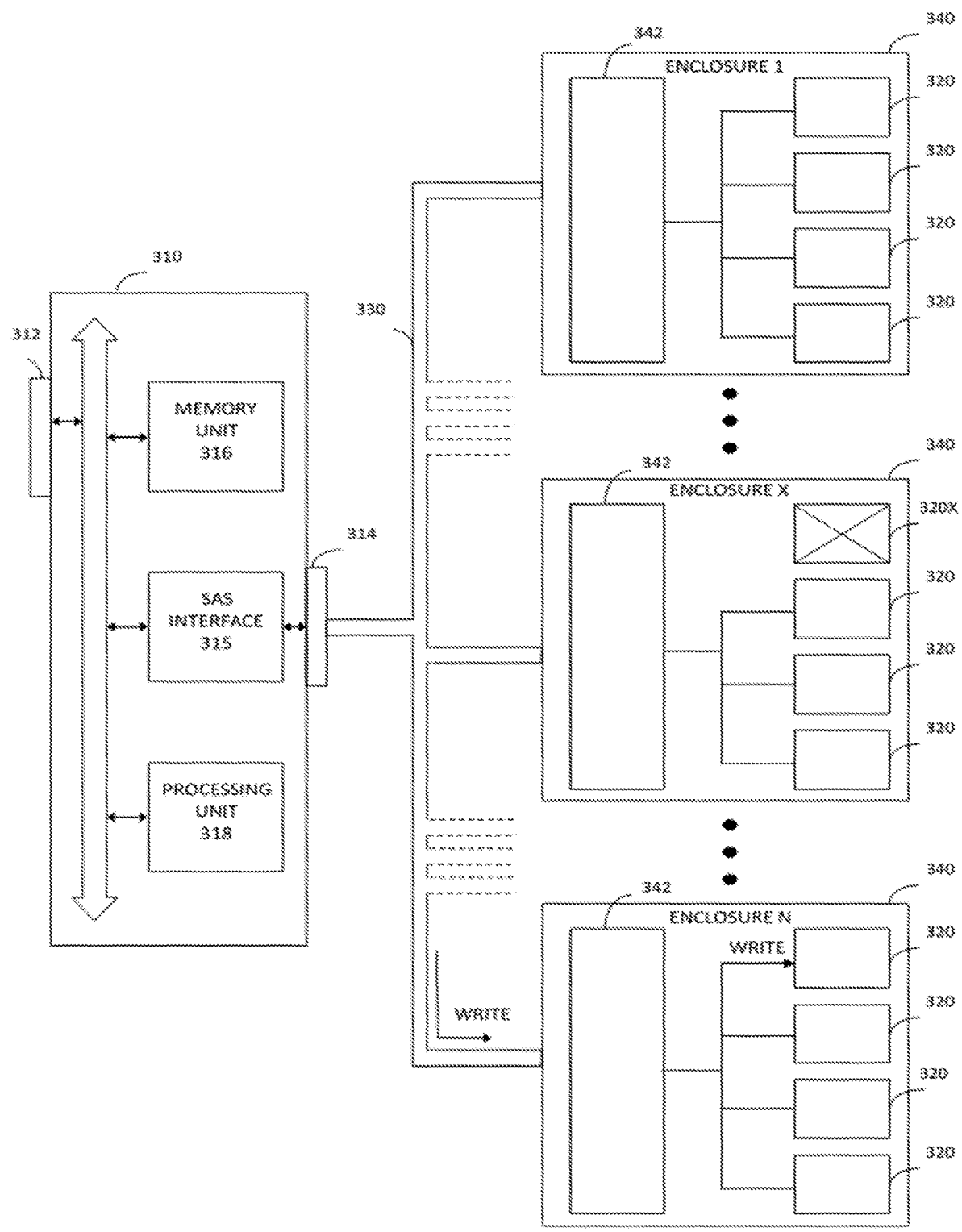
FIG. 3 is a schematic block diagram illustrating a process for data rebuild using regenerated data in a RAID system in accordance with example implementations of the present disclosure.

FIGS. 2 and 3 are schematic block diagrams illustrating a process for data regeneration and rebuild in a RAID system with distributed parity in accordance with example implementations of the present disclosure. In particular, FIG. 2 illustrates a process for regenerating data of a failed storage device in a RAID system according to example implementations of the present disclosure, such as the system 1 of FIG. 1, and FIG. 3 illustrates a process for data rebuild in the RAID system using the regenerated data from the process of FIG. 2.

Referring to FIG. 2, RAID system implements a RAID scheme or level having distributed parity, such as RAID 5 or RAID 6, using a storage controller 210. Storage controller 210 manages the storage of data in, and retrieval of data from, a plurality of storage devices 220 forming the RAID array in accordance with the RAID scheme using conventional techniques. Further details of RAID schemes, and their associated data formats, can be found in the document entitled: "Common RAID Disk Drive Format (DDF) Standard" of the Storage Networking Industry Association (SNIA).

Typically, a RAID regenerate/rebuild operation may be initiated in the storage controller 210 in response to detecting a failure in an identified one of the plurality of storage devices 220, such as storage device 220X. In accordance with conventional techniques, in order to regenerate a single data chunk (e.g., data block) from the failed storage device 220X, the storage controller 210 needs to read user and parity data from each of the other storage devices 220 within the same redundancy group. The number of read operations is therefore dependent upon the number of devices in the same redundancy group. In the case of an implementation that uses "wide striping", in which data is distributed across all of the storage devices in the RAID array, for a single drive failure, the number of read operations for a single chunk of data will be equal to the number of members of the stride redundancy group minus one. However, when "wide striping" is used, although the number of members of a single stride redundancy group is a fraction of the array size, since the totality of strides have their membership distributed approximately evenly across the whole array in different subsets, the number of storage devices involved in the reconstruct process of multiple data chunks may correspond to one less that the total number of storage devices in the RAID array. Accordingly, in the above example in which the RAID array has 128 storage devices, the storage controller may read from 127 storage devices in parallel, and reconstruct multiple stride redundancy groups concurrently. Such a large number of read operations by the storage controller 210 is time consuming, which may risk further storage device failures (e.g., involving storage devices 220 other than device 220X) during the regenerate/rebuild operation and, thus, potential fatal data losses. Furthermore, the speed of the storage area network between the storage controller 210 and the storage devices 220 (e.g., SAS network) is typically faster that the speed of an internal data bus within the storage controller (e.g., PCIe). With the increasing use of parallel read and write operations during a rebuild operation in a distributed RAID system, this may lead to bottlenecks within a SAS interface 215 (e.g., SAS chip) and processing unit 218 (e.g., RAID processor) of the storage controller 210.

Accordingly, example implementations of the present disclosure seek to reduce the total number of read operations by the storage controller 210, and thus the amount of data flowing through SAS interface 215, for a regenerate/rebuild operation. This is achieved by reading data and applying the parity algorithm (i.e., XOR operation) to derive results (herein called "intermediate XOR data") at enclosure-level. The functionality (e.g., memory and processing resources) for deriving the intermediate XOR data may be provided in, or associated with, each enclosure. In example implementations, the required functionality is provided in the form of an extension of the SES functionality, which additionally interacts with the enclosure I/O interface (e.g., SAS interface 215) to provide a so-called "Enclosure XOR Service". In accordance with this Enclosure XOR Service, the storage controller 210 reads the intermediate XOR data from each enclosure 240 using a single read operation (herein called "EnclosureXOR Read" operation) and applies the parity algorithm to regenerate the lost data block. Since each enclosure 240 may comprise 32 or more storage devices 220, the number of read operations performed by the storage controller 210, and thus the amount of data flowing through SAS interface 215, is thereby considerably reduced.

The ability to generate and use intermediate XOR data provided by the Enclosure XOR service is possible by virtue of the nature of XOR, on which the parity algorithm is based. In particular, XOR is distributive, associative and commutative. In consequence, when deriving an XOR result for a data chunk (e.g., data block), it is possible to apply the XOR operation to the data operands read from storage devices in the same redundancy group in any order. Thus, the XOR operation can be applied cumulatively using a "pyramid" of intermediate XOR results data derived from separate groups of operands, instead of a flat "chain" of consecutive operand pairs as in conventional techniques.

In the present disclosure, the term "XOR-based parity data" or "XOR data" refers to results data determined using a parity algorithm that applies the XOR operation to user data in the same stride or redundancy group. For example, 17 user data elements are XORed together to produce a parity element. If one data element is lost, XORing the remaining data elements with the parity element will result in the missing data element. "XOR data" is also called "Parity" herein.

For simplicity, the following description relates to the use of a parity algorithm comprising a simple XOR operation. As the skilled person will appreciate, the present disclosure may be used in conjunction with any XOR-based erasure code, where the storage devices may be located in multiple storage device enclosures. The term "intermediate XOR data" refers to XOR results data determined using operand data comprising user and parity data chunks read from a plurality of storage devices in the same redundancy group in a single storage device enclosure. As the skilled person will appreciate, since all the data for a stride, which is required to reconstruct a data chunk, may be spread across storage devices in multiple device enclosures, the XOR results data derived using operand data from a single enclosure is "intermediate" as opposed to being final or conclusive.

Returning to FIG. 2, in response to initiating the RAID rebuild operation for regeneration of a data chunk (e.g., data block) from the failed storage device 220X, storage controller 210 sends an "EnclosureXOR Read Request" message via communication port 214 over a storage area network 230 to each enclosure 240 containing storage devices 220 with data in the same redundancy group as the lost user or parity data chunk. EnclosureXOR Read Request messages may be sent to each enclosure 240 concurrently, sequentially or otherwise, according to application requirements. EnclosureXOR Read Request message may be a custom (or modified) Read Request message compliant with the relevant communication protocol for the network 130 (e.g., SAS). EnclosureXOR Read Request message includes an identifier for each of the storage devices 220, together with a corresponding logical block address (LBA) and data length, respectively corresponding to the start address and size of the data chunk (e.g., data block) to be read and used as an operand in the XOR operation. As the skilled person will appreciate, since the size of the data chunk (e.g., data block) is predefined by the RAID scheme, any type of indicator for the starting address of the data chunk in each storage device is sufficient to identify the data to be read.

Each enclosure 240 receives its corresponding EnclosureXOR Read Request message and forwards it to enclosure processor 242. Enclosure processor 242 performs multiple read operations of the relevant storage devices 220, for example using the respective lba values specified in the EnclosureXOR Read Request message. As the skilled person will appreciate, the read operations may be performed concurrently, sequentially or otherwise, according to application requirements. In example implementations, for instance in which the enclosure processor 142 is integral or associated with the SES capability of the enclosure 140, data may be received serially from the storage devices 242 over a single physical layer (PHY) interface (e.g., SES PHY interface).

Enclosure processor 242 may store the read data in memory (e.g., a buffer or cache), if required. Enclosure processor 242 further applies the XOR operation cumulatively to the data read from all of the relevant storage devices in the enclosure 240 to derive an intermediate XOR result. Enclosure processor 242 may store the intermediate XOR result derived from all of the data read from the storage devices 220 in the enclosure 240, as the above-mentioned "intermediate XOR data" in memory (e.g., a buffer or cache). As the skilled person will appreciate, data read from the storage devices may be used as input operands in the XOR operation, and the XOR results of such XOR operations used as further input operands. Thus, cumulative XOR operations are performed on the data read from all of the relevant storage devices, at enclosure-level, to derive the intermediate XOR result. As the skilled person will appreciate, the read data and XOR results can be used in any order in the XOR operation.

Each enclosure 240 sends an "EnclosureXOR Response" message over the storage area network 230 to the storage controller 210 in response to the EnclosureXOR Read Request message. EnclosureXOR Response message includes the intermediate XOR data (e.g., from memory) and an identifier for the enclosure 240 and/or each of the storage devices 220 in the enclosure 240 from which data, whether user data or parity data, was read to derive the intermediate XOR data.

The storage controller 210 receives an EnclosureXOR Response message from each of the storage enclosures 240 at the port 214 and corresponding interface device 215 (e.g., SAS chip) and passes it over the internal data bus to a memory unit 216. A processing unit 218 (e.g., RAID processor) of the storage controller 210 applies the XOR operation to the intermediate XOR data and regenerates the data chunk. As the skilled person will appreciate, storage controller 210 may use conventional processing resources to apply the parity algorithm (e.g., XOR operation) to regenerate the data chunk, except that each operand corresponds to an intermediate XOR result derived from data read from multiple storage devices of the redundancy group in a single enclosure rather that the data read from a single storage device of the redundancy group as in the conventional technique. Moreover, in the event of failure of one or more of the EnclosureXOR Read Request messages, the storage controller 210 may send separate Read Request messages to each of the relevant storage devices 220 storing data or Parity in the same redundancy group in the relevant enclosure 240. The storage controller 210 may then receive and process data read from the separate storage devices 220 in accordance with conventional techniques, so as to derive a corresponding XOR result for use, together with the intermediate XOR data received from other enclosures, in rebuilding the data chunk (e.g., data block). Storage controller 210 may store the regenerated data chunk in the memory unit 216.

Referring now to FIG. 3, storage controller 310 may complete the RAID rebuild operation by writing the rebuilt data chunk (e.g., data block) to the RAID array, in accordance with conventional techniques. For example, the rebuilt data block may be written to a spare storage device 320 in the same enclosure 340 as the failed storage device 320X or to spare space in any one of the storage devices 320 consistent with the relevant RAID scheme. In particular, as shown in FIG. 3, storage controller 310 sends a Write Request message to one or more storage devices 320 over the storage area network 330, the message including the rebuilt data, identifying the storage device 320 and specifying the LBA start address (or equivalent indicator of the address location) for writing the rebuilt data block therein. The storage device 320 receives the Write Request message and writes the rebuilt data block at the specified storage location, accordingly.

Figure 4:
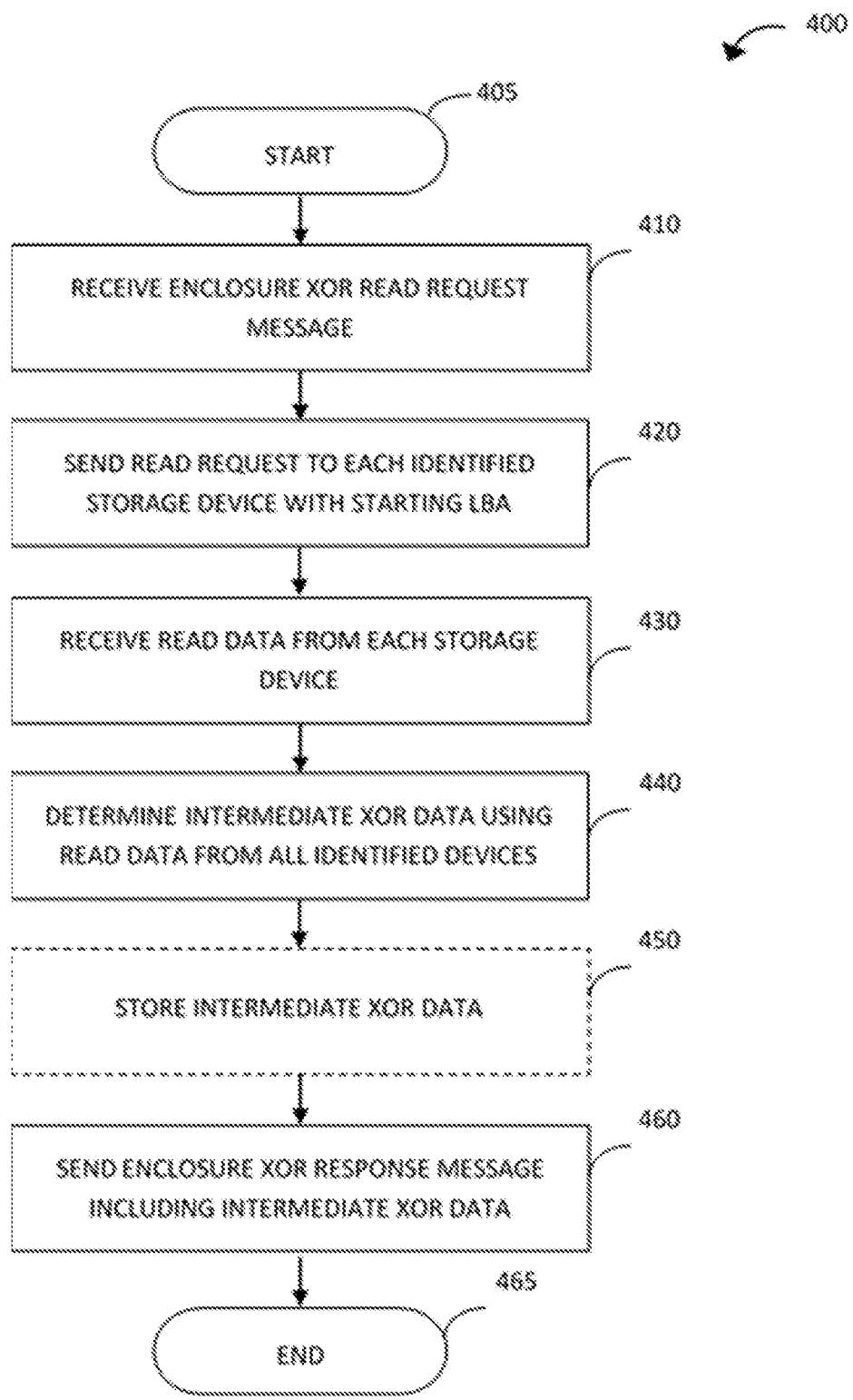
FIG. 4 is a flowchart of a method for processing data to determine intermediate XOR data in accordance with example implementations of the present disclosure.

FIG. 4 is a flowchart of a method 400 for generating intermediate XOR data in accordance with example implementations of the present disclosure. In particular, although not exclusively, the method 400 may be performed by the enclosure processor 42 of the RAID system of FIG. 1 and/or the enclosure processor 242 of the RAID system of FIG. 2.

The method starts at step 405. At step 410 the method receives an EnclosureXOR Read Request message. As described above, the EnclosureXOR Read Request message identifies one or more valid storage devices in the same redundancy group and a corresponding address or address range (e.g., start lba value and optionally data length) for reading data from each storage device.

At step 420, the method sends a read request to each identified storage device including the corresponding address or address range for reading data therefrom. Step 420 may send a read request to the storage devices concurrently, sequentially or otherwise, according to application requirements. At step 430, the method receives read data from each of the storage devices. At step 440, the method determines intermediate XOR data for all of the relevant storage devices of the enclosure (i.e., the storage devices identified in the EnclosureXOR Read Request message). In particular, step 440 applies the XOR operation cumulatively to the read data from all of the storage devices. For example, step 440 may use read data from first and second storage devices as initial operands for the XOR operation, and then use the XOR result together with read data from a next storage device as next operands for the XOR operation, and so on until the XOR equation has been applied to the read data of all of the storage devices. In another example, step 440 may use read data from pairs of storage devices as operands for the XOR operation, and use the XOR results as further operands, and so on until the XOR equation has been applied to the read data of all of the storage devices. As the skilled person will appreciate, the result of applying the XOR operation cumulatively to the read data of all of the storage devices corresponds to the above-described intermediate XOR data for the enclosure.

At optional step 450, the method stores the intermediate XOR data, and at step 460 the method sends an EnclosureXOR Response message, including the intermediate XOR data for the enclosure and an identifier of the enclosure and/or identifying the storage devices from which read data has been used to derive the intermediate XOR data. The data payload of the EnclosureXOR Response message may be the same as a conventional response message to a single device read request, in accordance with the communication protocol of the relevant storage area network. As the skilled person will appreciate, the data in an EnclosureXOR Response message may be utilized by a storage controller in the same way as if the data had been returned from a single drive in the redundancy group, using conventional techniques, and contributed to the overall XOR result similarly. The method ends at step 465.

Figure 5:
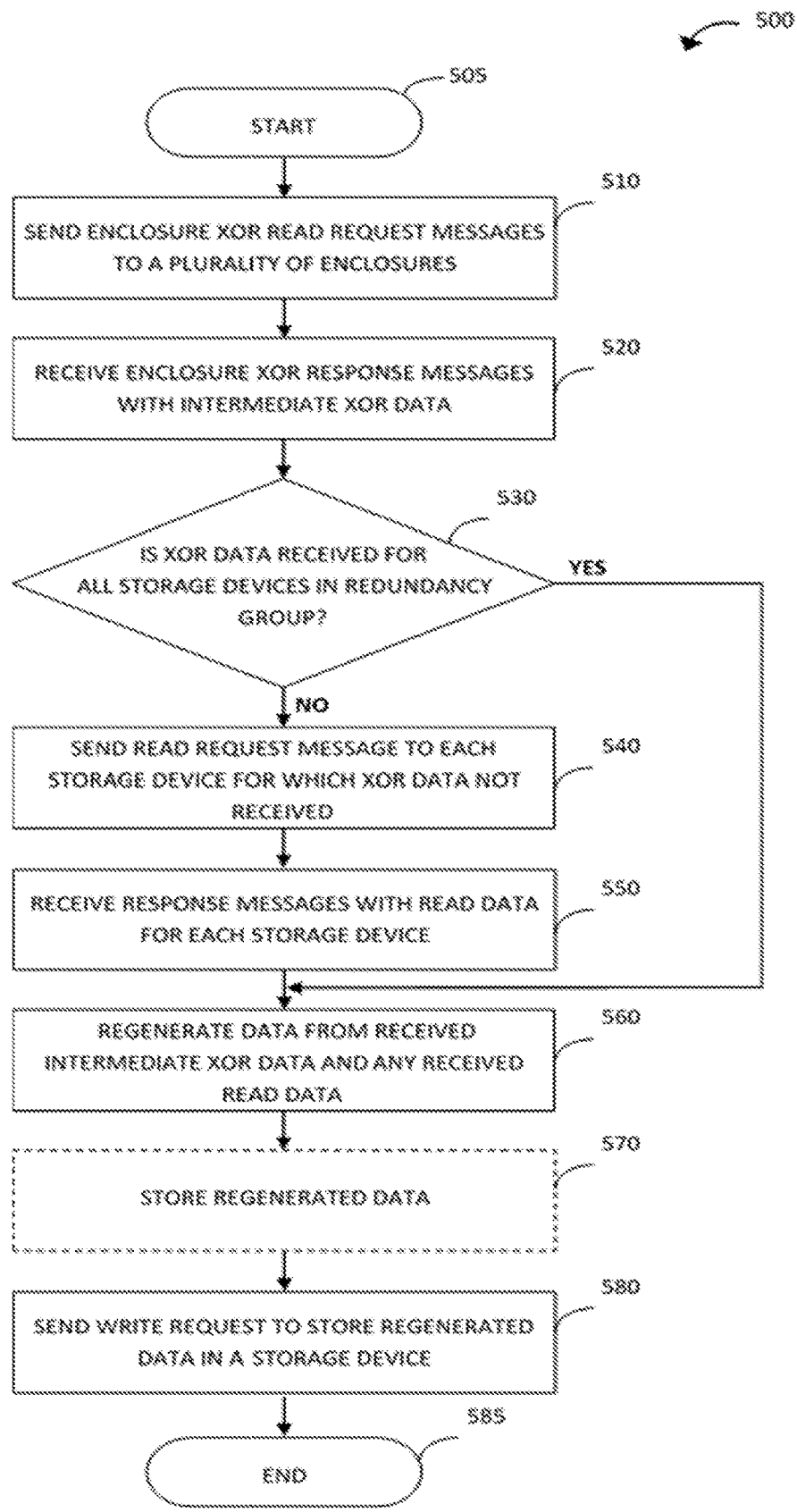
FIG. 5 is a flowchart of a method for regenerating data using intermediate XOR data in accordance with example implementations of the present disclosure.

FIG. 5 is a flowchart of a method 500 for regenerating data from intermediate XOR data in accordance with example implementations of the present disclosure. In particular, although not exclusively, the method 500 may be performed by the storage controller 10 of the RAID system of FIG. 1 and/or the storage controller 210 of the RAID system of FIG. 2 and/or the storage controller 310 of the RAID system of FIG. 3. The method 500 may be performed in conjunction with the method 400 as described above.

The method 500 starts at step 505. For instance, step 505 may start in response to a determination of a failure of a storage device in a RAID system requiring a RAID rebuild operation for regenerating/rebuilding lost data (e.g., a data chunk) associated with the failed storage device. As the skilled person will appreciate, the identity of the failed storage device may be determined using conventional techniques, such that the identity of the valid storage devices (i.e., the operating storage devices that have not failed) in the same redundancy group. In particular, the location of the parity data required for data recovery may also be determined using conventional RAID techniques, based on information that maps user data to physical storage devices and location information that maps physical storage devices to enclosures, thereby enabling identification of all of the valid storage devices that are in any particular redundancy group for a stride and their corresponding enclosures.

At step 510, the method sends EnclosureXOR Read Request messages to a plurality of storage enclosures. In particular, step 510 sends an EnclosureXOR Read Request message to each storage enclosure containing a valid storage device storing data in the same redundancy group (i.e., 'stride') as the lost data chunk for regeneration. As described above, each EnclosureXOR Read Request message identifies at least one storage device in the enclosure and a corresponding address or address range (e.g., start lba value and optionally data length) for reading data from the respective storage device.

At step 520, the method receives EnclosureXOR Response messages from each of the storage enclosures in response to the EnclosureXOR Read Request messages sent at step 510. Each EnclosureXOR Response message includes intermediate XOR data for the enclosure and an identifier of the enclosure and/or the storage devices from which read data has been used to derive the intermediate XOR data.

At step 530, the method determines whether intermediate XOR data has been received for all valid storage devices in the same redundancy group (i.e., stride) as the lost data chunk for regeneration. For example, step 530 may compare identifiers of the storage devices in the EnclosureXOR Response message with the identifiers in the EnclosureXOR Read Request message for each enclosure. As the skilled person will appreciate, in a scenario involving failure of the EnclosureXOR Read Request/Response command sequence (i.e., failure of EnclosureXOR service) for a particular enclosure, the corresponding intermediate XOR data will not be received. In other scenarios, an enclosure may be unable to read data from one or more of the identified storage devices. In such scenarios, it will not be possible to regenerate the lost data chunk, since it is necessary to perform the XOR operation on data read from all of the storage devices in the same redundancy group (i.e., stride) for correct data recovery. Thus, if XOR data derived from all storage devices in the same redundancy group has not been received, it is necessary to obtain the unused data (i.e., the stride data that has not been used to determine the intermediate XOR data included in the EnclosureXOR Response message) from the corresponding storage devices before the data chunk can be regenerated. Accordingly, if step 530 determines that intermediate XOR data has been received for all storage devices in the same redundancy group, the method proceeds to step 540. Otherwise, the method proceeds to step 560.

At step 540, the method sends a Read Request message to each storage devices for which XOR data has got not been received, for example using conventional techniques. In particular, step 540 may send a Read Request message to each storage device in the same redundancy group to read the relevant unused data. Each Read Request message includes an identifier of the storage device and an address or address range (e.g., starting LBA value and optionally data length) for the data to be read, in accordance with any suitable Read command compliant with the communication protocol of the storage area network (e.g., SAS READ command). As the skilled person will appreciate, the Read Request messages may be sent to the relevant storage devices concurrently, sequentially or otherwise according to application requirements and the XOR command sequence adopted.

At step 550, the method receives Read Response messages including the data read from each corresponding storage device. The received data may comprise raw data read from the specified address of each storage device, or XOR data derived therefrom, according to the XOR command sequence implemented.

At step 560, the method regenerates the lost data chunk (e.g., data block) using the received data. In particular, step 560 applies the XOR operation cumulatively, using: (i) the intermediate XOR data contained in EnclosureXOR Response messages received at step 520, and (ii) raw or XOR data received in Read Response messages received at step 550. At optional step 570, the method stores the regenerated data chunk in memory (e.g., a cache). Moreover, in the case that the method 500 is used for a RAID rebuild operation, at step 580 the method sends a write request to store the regenerated data chunk in an appropriate storage device of the RAID array. The method then ends at step 585.

In a variation of the method of FIG. 5, if step 530 determines that intermediate XOR data has not been received for all storage devices in the same redundancy group, at least one retry attempt of the EnclosureXOR Read Request/Response command sequence may be performed, before proceeding to step 540.

As the skilled person will appreciate, the methods of FIGS. 4 and 5 may be used to concurrently or sequentially regenerate multiple different data chunks (i.e., data blocks, strips etc.) of lost data from a failed storage device.

Figure 6:
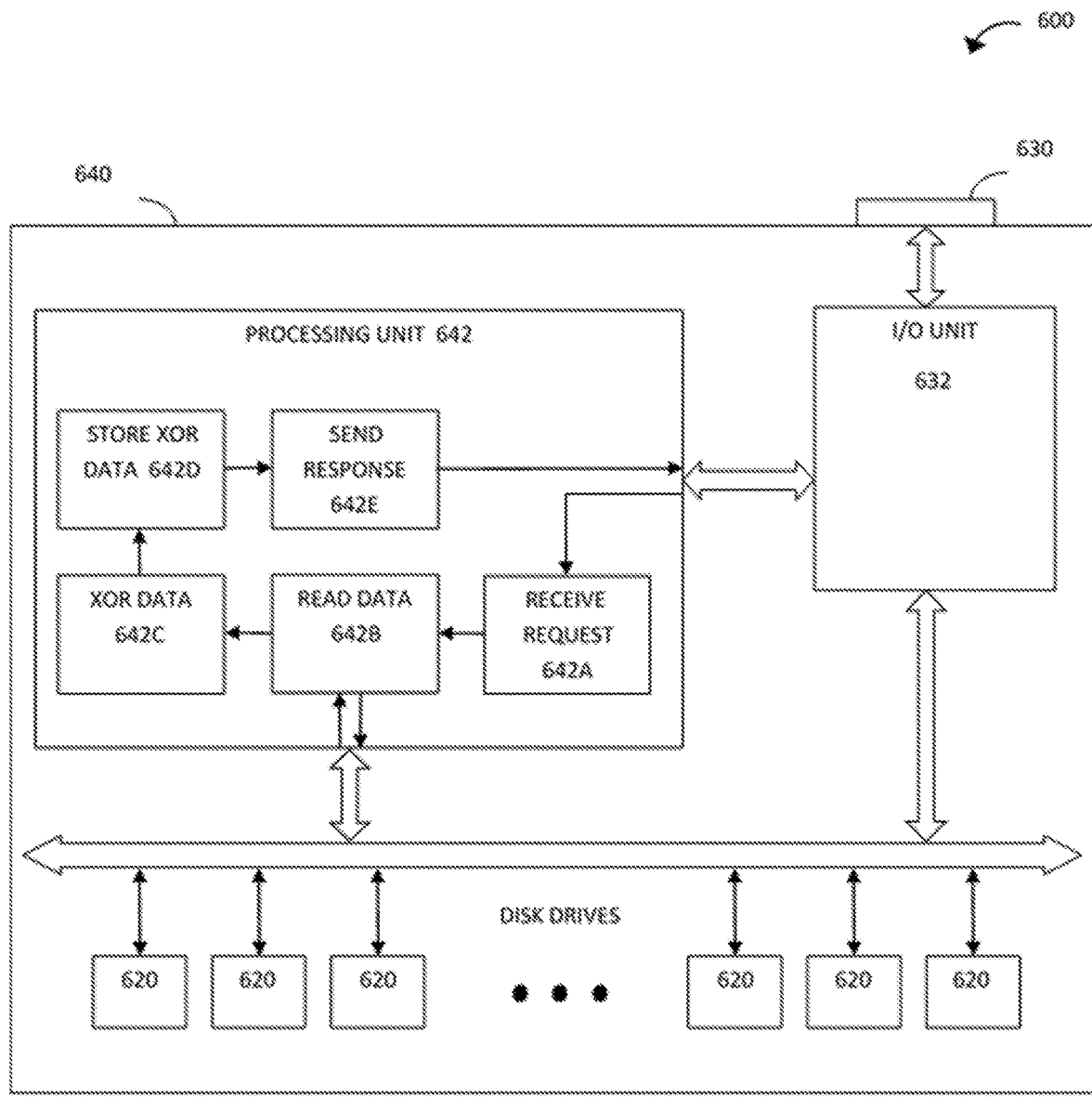
FIG. 6 is a schematic block diagram of a storage enclosure system in accordance with example implementations of the present disclosure.

FIG. 6 is a schematic block diagram of a system 600 comprising a storage enclosure 640 in accordance with example implementations of the present disclosure. In particular, storage enclosure 640 may be used as a storage enclosure in any of the systems described herein, including the systems of FIGS. 1, 2 and 3.

Storage enclosure 640 comprises a plurality of disk drives 620 in communication with an input/output (I/O) unit 632 for sending and receiving data over a storage area network via a storage area network port 630. Storage enclosure 640 further comprises a processing unit 642 in communication with the disk drives 620 and the I/O unit 632. For example, enclosure processor 640 may comprise a SES processor having an SES PHY serial interface connected to disk drives 620. Thus, and as described above, processing unit 642 may be configured to perform SES functions according to application requirements. In accordance with example implementations of the present disclosure, processing unit 642 is configured to perform the method 400 of FIG. 4, as described above. In particular, the processing unit 642 of FIG. 6 comprises: a first sub-component 642A for receiving and processing an EnclosureXOR Read Request message from I/O unit 632; a second sub-component 642B for reading data from disk drives 620 in accordance with the EnclosureXOR Read Request message; a third sub-component 642C for determining intermediate XOR data using the data read from the disk drives 620; a fourth, optional subcomponent 642D for storing the determined intermediate XOR data, and a fifth subcomponent 642E for sending an EnclosureXOR Response message comprising the intermediate XOR data via I/O unit 632 and storage network area port 630 over the storage area network. Each of the first to fifth sub-components may be implemented in software, firmware or hardware, or any combination thereof.

Figure 7:
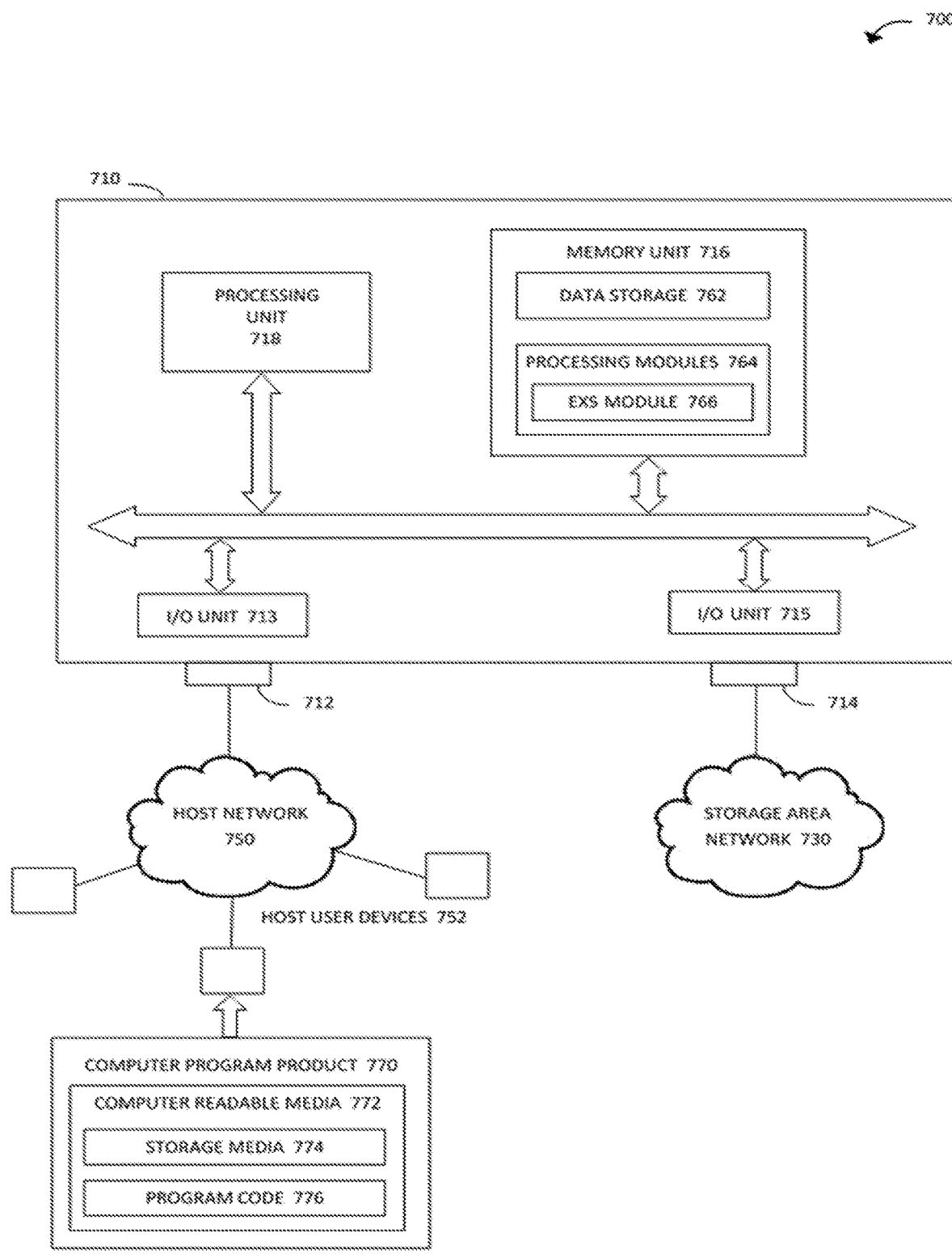
FIG. 7 is a schematic block diagram of a storage controller system in accordance with example implementations of the present disclosure.

FIG. 7 is a block diagram of a system 700 comprising a storage controller 710 in accordance with example implementations of the present disclosure. In particular, storage controller 710 may be used as the storage controller in any of the systems described above, including the systems of FIGS. 1-3 and 6.

Storage controller 710 comprises a memory unit 716, a processing unit 718, a first input/output (I/O) unit 713 for a first (e.g., front-end) port 712 for connection to a host network 750 and a second I/O unit 715 for a second (e.g., back-end) port 714 for connection to a storage area network 730. As the skilled person will appreciate, in other example implementations, first and second I/O unit may be combined into a single I/O unit. Memory unit 716, processing unit 718, and first and second I/O units 713, 715 of storage controller 710 are configured to communicate data internally via a system bus (e.g., Peripheral Component Interconnect Express (PCIe) bus) and externally over storage area network 730 and host network 750 in accordance with respective storage area network (e.g., SAS) and host system (e.g., TCP/IP) communication protocols.

Memory unit 716 comprises data storage 762 (e.g., cache memory) for storing data received by storage controller 710 via first and second I/O units 713, 715. In addition, memory unit 716 comprises processing modules 764 for processing data received by storage controller 710 in accordance with a RAID scheme. In example implementations of the present disclosure, processing modules 764 include an Enclosure XOR Service (EXS) module 766 comprising program instructions, executable by processing unit 718, for performing the method 500 of FIG. 5. As the skilled person will appreciate, in other example implementations, the processing unit 718 may be configured to perform the method of FIG. 5 without the use of EXS module 766.

In example implementations of the present disclosure, a computer program product 770 may be provided, as shown in FIG. 7. The computer program product 770 may include a computer readable media 772 having storage media 774 and program instructions 776 (i.e., program code) embodied therewith. The program instructions 776 may be loaded onto the memory unit 716 of storage controller 710, for example from a host user device 752 connected to host network 750 via first I/O unit 713. The program instructions 776 may comprise the above-described processing modules 764, including EXS module 766. The program instructions 776 may be executable by the processing unit 718 of storage controller 710 to recover lost data (e.g., by performing a regenerate or rebuild operation) in a RAID array, as described above with reference to FIGS. 2, 3 and 5.

As the skilled person will appreciate, the above-described example implementations of the present disclosure provide enhanced data processing and data storage (e.g., buffers and/or cache memory) associated with a storage device enclosure. Such resources may be implemented in any suitable form and provided at any suitable location within a RAID system or other data storage arrangement. In the above-described example implementations, the resources are provided within the storage enclosure device as an extension of SES functionality of a SAS expander. In other example implementations, the resources may be provided within a crossbar switch (or any other suitable component) of an expander or may be provided externally from, but associated with, such an expander.

As the skilled person will further appreciate, the above-described example implementations of the present disclosure provide enhanced command sequencing, data processing, and storage by a storage controller. The storage controller may be any suitable processing device having an interface for communicating with storage devices and storage device enclosures. For example, the storage controller may be a RAID array controller for communicating with and managing a RAID storage array using any suitable standard or proprietary storage device communication protocols such as ATA, SATA, SCSI, and SAS.

As the skilled person will appreciate, in the above-described example implementations, the storage controller is configured to orchestrate a regeneration and/or rebuild operation from intermediate (enclosure-level) XOR data received from multiple storage enclosures. Thus, the storage controller may be configured to operate as a SCSI initiator using the Enclosure XOR Read Request/Response command sequence, whereby intermediate XOR data is received for each enclosure.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object-oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described example implementations. The terminology used herein was chosen to best explain the principles of the example implementations, the practical application or technical improvement over technologies found in the marketplace, or to enable others of ordinary skill in the art to understand the example implementations disclosed herein.

What is claimed is:

1. An apparatus comprising:
  a RAID array controller that distributes a stride of parity data for a parity group across a RAID array consistent with a selected distributed RAID scheme, the RAID array comprising a plurality of storage enclosures each having a plurality of storage drives within, wherein the RAID array controller:
  determines a set of drives and logical block addresses corresponding to the parity group;
  divides the set of drives into subsets of drives that are located within each individual storage enclosure of the plurality of storage enclosures;
  issues a single enclosure-level XOR read ("EnclosureXOR Read") request to each storage enclosure corresponding to the subsets of drives to read enclosure-level intermediate XOR data calculated by individual storage enclosures for each subset of drives;
  sends a read request to read a single enclosure-level intermediate XOR data result from the individual storage enclosures, the enclosure-level intermediate XOR data results corresponding to XOR data for the subset of drives within the individual storage enclosures; and
  in response to receiving the enclosure-level intermediate XOR data results from all storage drives in the parity group, calculates an array level XOR result by performing an XOR operation on the enclosure-level intermediate XOR data results from the individual storage enclosures.

2. The apparatus of claim 1, wherein in response to not receiving the enclosure-level intermediate XOR data results from all storage drives in the parity group, the RAID array controller performs at least one retry attempt of the EnclosureXOR Read.

3. The apparatus of claim 1, wherein the RAID array controller sends the read request to each of the individual storage enclosures concurrently.

4. The apparatus of claim 1, wherein the RAID array controller further writes the array level XOR result to a spare space on one of the plurality of storage drives consistent with the selected distributed RAID scheme.

5. The apparatus of claim 1, wherein the distributed RAID scheme is selected from RAID5 and RAID6.

6. The apparatus of claim 5, wherein the RAID array controller regenerates a data chunk corresponding to a lost data chunk using the array level XOR result and raw data read from the plurality of storage drives.

7. The apparatus of claim 6, wherein the RAID array controller sends a write request to store the regenerated data chunk to a predetermined storage drive of the RAID array consistent with the selected distributed RAID scheme.

8. The apparatus of claim 7, wherein the RAID array controller reads enclosure-level intermediate XOR data from multiple parity groups corresponding to multiple strides and reconstructs multiple stride redundancy groups concurrently.

9. The apparatus of claim 1, wherein the EnclosureXOR Read function is implemented as an extension to a SCSI attached enclosure services protocol.

10. A method comprising:
  distributing a stride of parity data for a parity group across a RAID array consistent with a selected distributed RAID scheme, the RAID array comprising a plurality of storage enclosures each having a plurality of storage drives within;
  determining a set of drives and logical block addresses corresponding to the parity group;
  dividing the set of drives into subsets of drives that are located within each individual storage enclosure of the plurality of storage enclosures;
  issuing a single enclosure-level XOR read ("EnclosureXOR Read") request to each individual storage enclosure corresponding to the subsets of drives to read enclosure-level intermediate XOR data calculated by each storage enclosure for each subset of drives;
  sending a read request to read a single enclosure-level intermediate XOR data result from the individual storage enclosures, the enclosure-level intermediate XOR data results corresponding to XOR data for the subset of drives within the individual storage enclosures; and
  in response to receiving the enclosure-level intermediate XOR data results from all storage drives in the parity group, calculating an array level XOR result by performing an XOR operation on the enclosure-level intermediate XOR data results from the individual storage enclosures.

11. The method of claim 10, wherein in response to not receiving the enclosure-level intermediate XOR data results from all storage drives in the parity group, performing at least one retry attempt of the EnclosureXOR Read.

12. The method of claim 10, further comprising sending the read request to each of the individual storage enclosures concurrently.

13. The method of claim 10, further comprising writing the array level XOR result to a spare space on one of the plurality of storage drives consistent with the selected distributed RAID scheme.

14. The method of claim 10, wherein the distributed RAID scheme is selected from RAID5 and RAID6.

15. The method of claim 14, further comprising regenerating data corresponding to a lost data chunk using the array level XOR result and raw data read from the plurality of storage drives.

16. The method of claim 15, further comprising a write request to store the regenerated data chunk to a predetermined storage drive of the RAID array consistent with the selected distributed RAID scheme.

17. The method of claim 16, further comprising reading enclosure-level intermediate XOR data from multiple parity groups corresponding to multiple strides and reconstructs multiple stride redundancy groups concurrently.

18. The method of claim 10, wherein the EnclosureXOR Read function is implemented as an extension to a SCSI attached enclosure services protocol.

19. A computer program product for reducing a number of reads of XOR data in a multi storage enclosure RAID array, the computer program product comprising a computer readable storage medium having program instructions embodied therewith, the program instructions executable by a processor of a RAID storage controller to cause the RAID storage controller to:
- distribute a stride of parity data for a parity group across a RAID array consistent with a selected distributed RAID scheme, the RAID array comprising a plurality of storage enclosures each having a plurality of storage drives within;
- determine a set of drives and logical block addresses corresponding to the parity group;
- divide the set of drives into subsets of drives that are located within each individual storage enclosure of the plurality of storage enclosures;
- issue a single enclosure-level XOR read ("EnclosureXOR Read") request to each individual storage enclosure corresponding to the subsets of drives to read enclosure-level intermediate XOR data calculated by each storage enclosure for each subset of drives;
- send a read request to read a single enclosure-level intermediate XOR data result from the individual storage enclosures, the enclosure-level intermediate XOR data results corresponding to XOR data for the subset of drives within the individual storage enclosures; and
- in response to receiving the enclosure-level intermediate XOR data results from all storage drives in the parity group, calculate an array level XOR result by performing an XOR operation on the enclosure-level intermediate XOR data results from the individual storage enclosures.

20. The computer program product of claim 19, wherein the program instructions are further executable by the processor of the RAID storage controller to cause the RAID storage controller to:
- read enclosure-level intermediate XOR data from multiple parity groups corresponding to multiple strides and reconstruct multiple stride redundancy groups concurrently.

* * * * *